Nov. 6, 1951           F. GRIFFITH          2,574,260
DIE HEAD FOR CUTTING THREADS
Filed March 24, 1947                                                   4 Sheets-Sheet 1
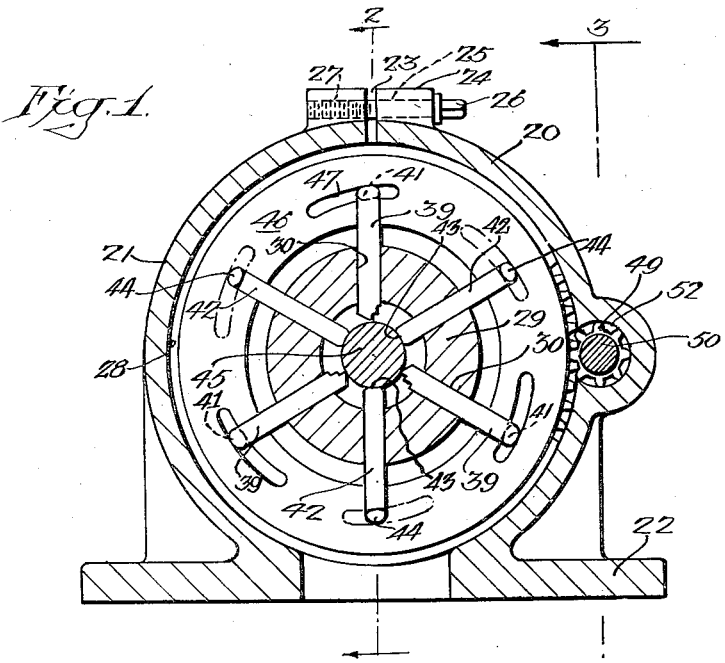
INVENTOR
Frank Griffith
BY
ATTORNEYS

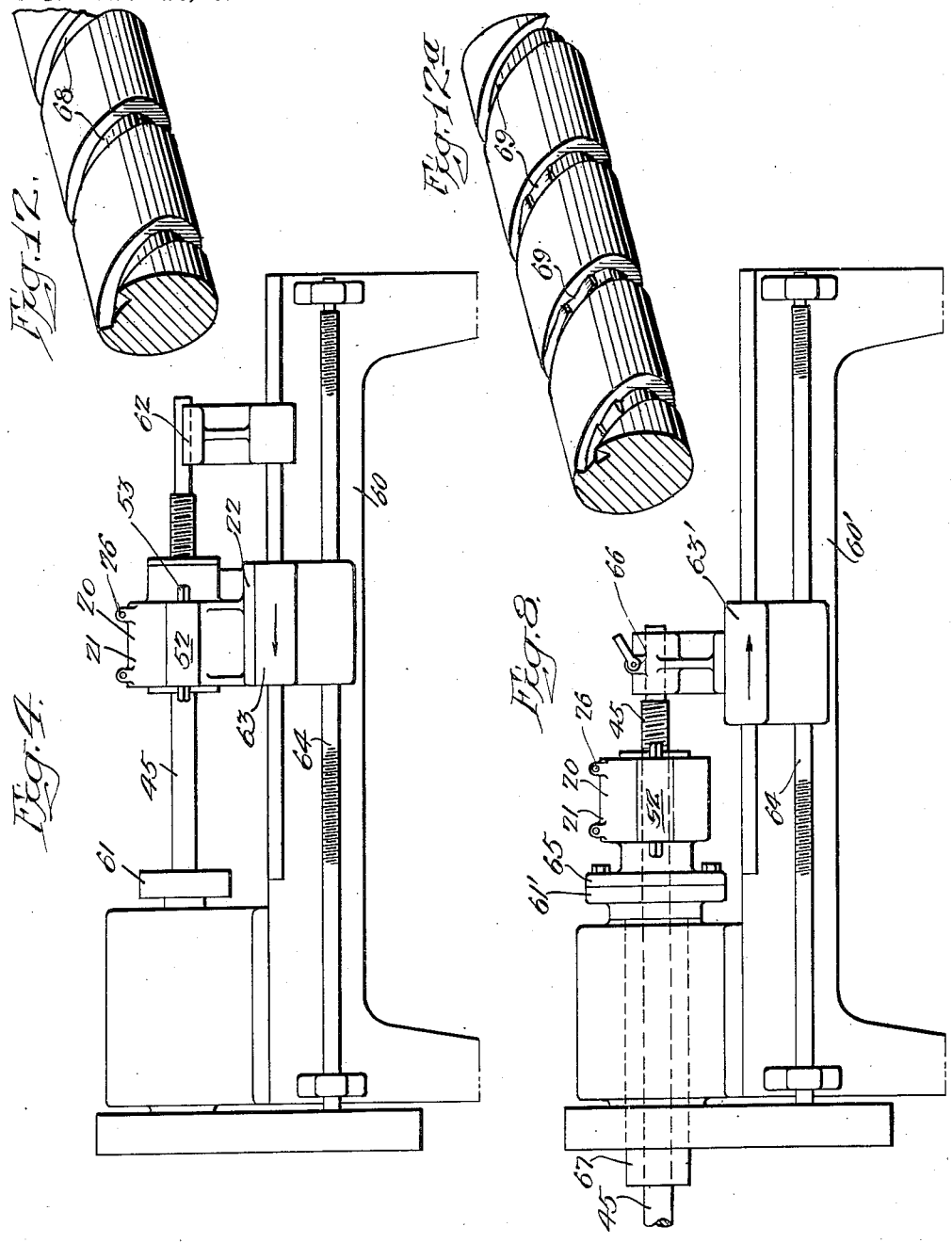

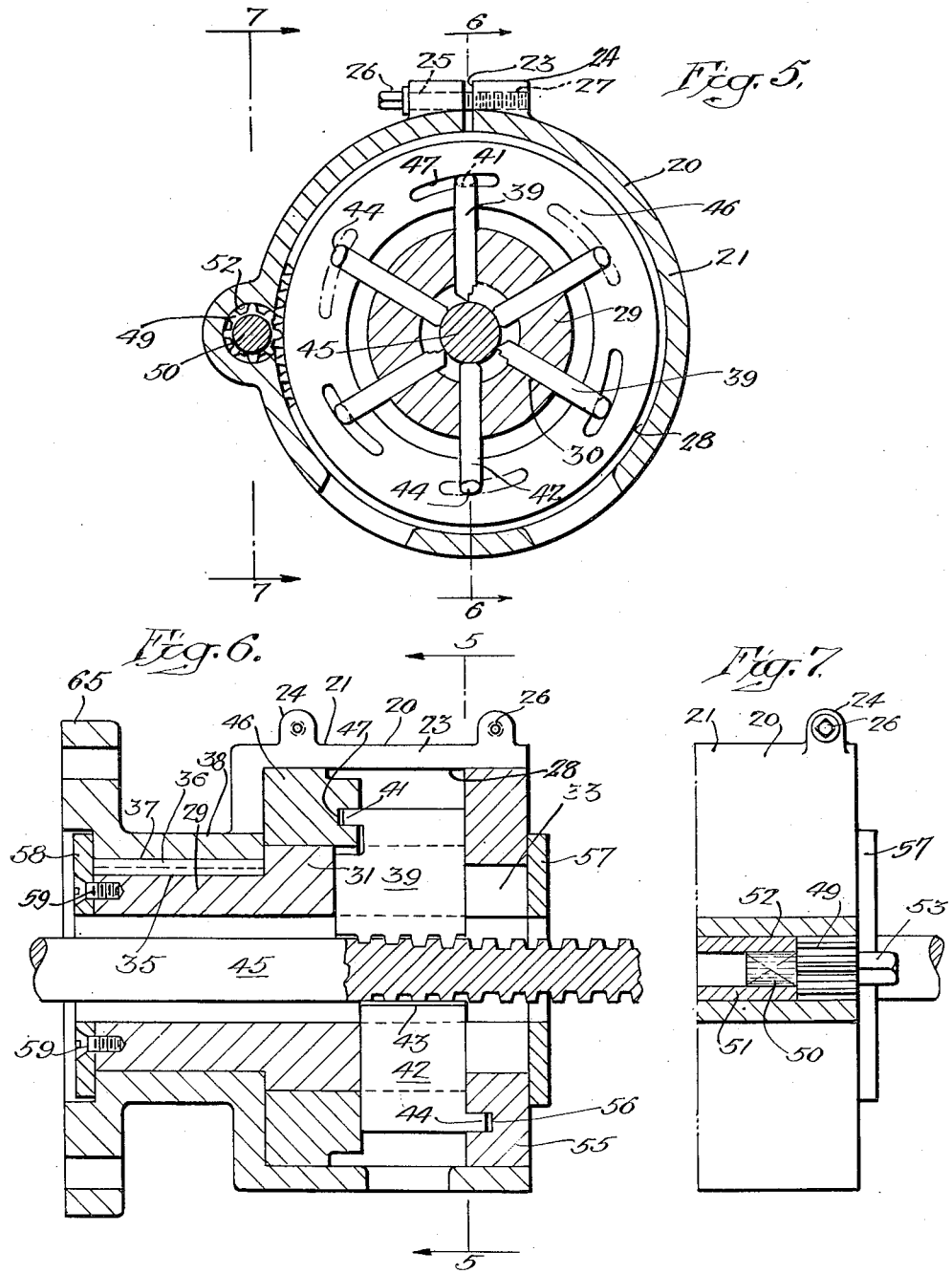

Nov. 6, 1951  F. GRIFFITH  2,574,260
DIE HEAD FOR CUTTING THREADS
Filed March 24, 1947  4 Sheets-Sheet 4
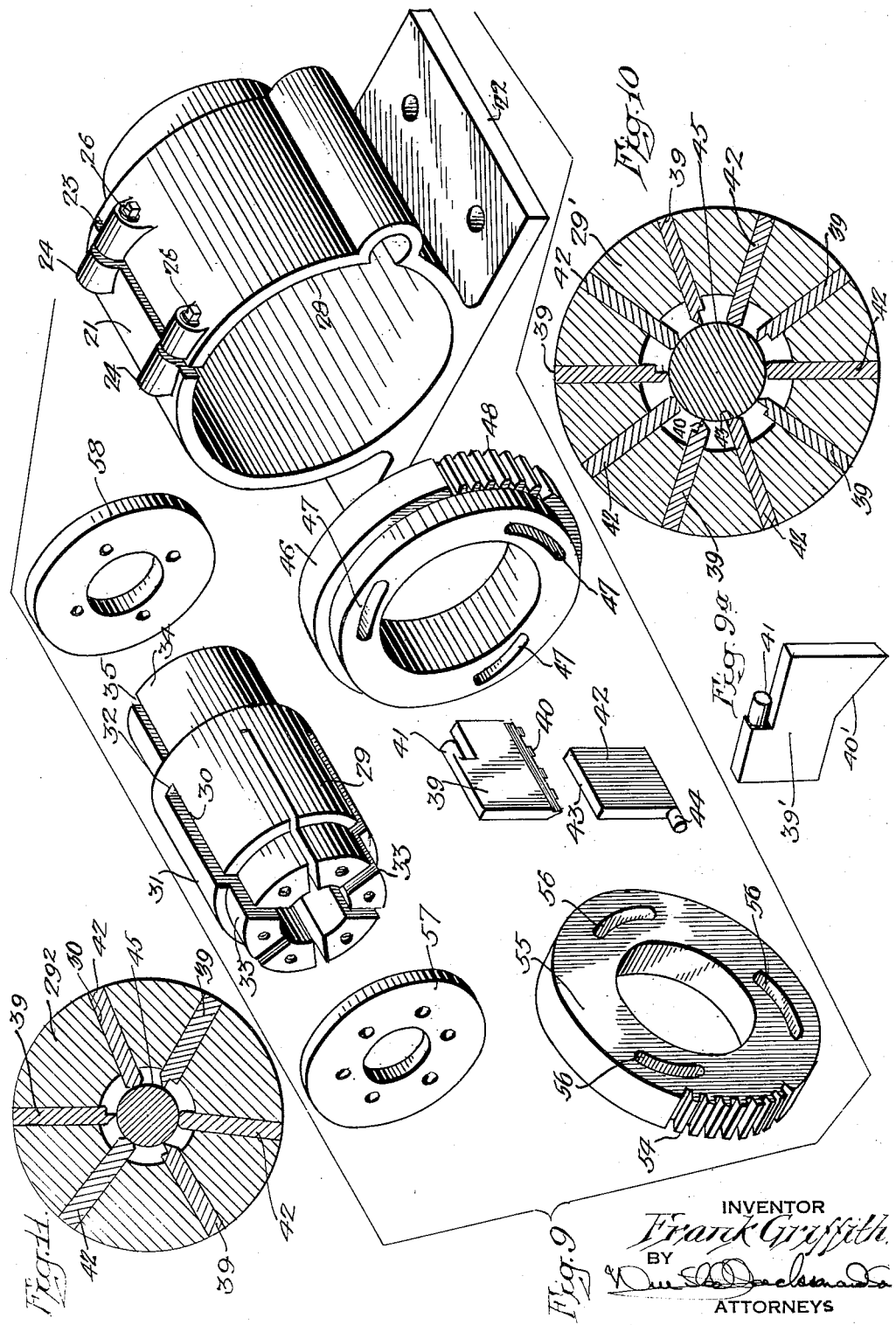
INVENTOR
Frank Griffith
BY
ATTORNEYS Patented Nov. 6, 1951

2,574,260

UNITED STATES PATENT OFFICE 2,574,260

DIE HEAD FOR CUTTING THREADS

Frank Griffith, Philadelphia, Pa.

Application March 24, 1947, Serial No. 736,638

4 Claims. (Cl. 10—127)

My invention relates to methods and mechanism for cutting threads.

A purpose of my invention is to avoid the loss of lead centers in cutting threads, particularly at high helix angles.

A further purpose is to permit cutting high helix angle threads at greater speed, with less tool cost, and with less danger of marring, chewing up or deforming the stock.

A further purpose, in cutting threads at high helix angles, is to apply the technique of die cutting, rather than milling of lathe tool cutting.

A further purpose is to guide the stock being externally threaded at points circumferentially between the threading dies and preferably diametrically opposite each threading die.

Further purposes appear in the specification and in the claims.

In the drawings I have chosen to illustrate a few only of the variations in which my invention may appear, choosing the forms shown from the standpoints of convenience in illustration, satisfactory operation and clear demonstration of the principles involved.

Figure 1 is a transverse section of my improved threading die taken on the line 1—1 of Figure 2.

Figure 2 is a longitudinal section taken on the line 2—2 of Figure 1.

Figure 3 is a fragmentary longitudinal section taken on the line 3—3 of Figure 1.

Figure 4 is a diagrammatic side elevation of a threading lathe to which my invention has been applied.

Figures 5 to 8 inclusive illustrate a variation in the threading head to apply it to the rotating rather than the stationary member.

Figure 5 is a transverse section taken on the line 5—5 of Figure 6.

Figure 6 is a longitudinal section taken on the line 6—6 of Figure 5.

Figure 7 is a longitudinal section taken on the line 7—7, of Figure 5.

Figure 8 is a diagrammatic side elevation of a threading lathe to which my invention has been applied.

Figure 9 is an exploded perspective view showing components of the threading head of Figures 1 to 4 inclusive, with the guide adjusting cam swung 90° with respect to the axis in order to illustrate the adjusting slots.

Figure 9a is a perspective showing a die for end cutting, in this case chamfering or tapering.

Figure 10 is a transverse section corresponding to Figures 1 and 5, showing a variation.

Figure 11 is a transverse section of a further variation.

Figures 12 and 12a are perspectives, one of a high helix angle thread, successfully cut by using the invention, and the other of a similar thread chewed-up because the lead center has been lost when the invention has not been employed.

In the drawings like numerals refer to like parts.

Describing in illustration, but not in limitation and referring to the drawings:

In the prior art, die cutting of external threads is widely used, because of its very high production rate, low tool cost, great adaptability, and high quality of product. There is, however, a class of threads to which die cutting has not previously been successfully applied, namely threads at high helix angles.

Much of this work at high helix angles is not of standard thread design, the thread cross section being in many cases special, and the purpose often being not that of a male thread mating with a female thread, but rather that of a groove or cam. Accordingly, I use the term "thread" herein in its broad sense to indicate a helix and to include grooves generally, whether the cross section be that of a standard thread or groove, or of a special thread or groove. This feature is of importance because the invention will find its best application in many cases to large work, such as feed cam slots, tension clamps and tie down rods on hydraulic and mechanical presses and other similar elements of heavy machinery. It will be understood also that the invention may be employed for end facing or cutting such as reducing with a box tool, tapering, chamfering or crowning, in which case a single cut circumference is taken rather than multiple turns as in the case of a helix.

When I refer herein to a high helix angle, I mean to designate a helix angle greater than 10°, thereby excluding the standard threads which are of low helix angle. When I refer herein to a very high helix angle, I mean to designate a helix angle greater than 30°, which is wholly beyond the range of standard threads. I find that my invention may be applied very effectively to produce high quality threads at high helix angles (greater than 10°) and even at very high helix angles (greater than 30°).

In the prior art when high helix angle thread cutting has been attempted on thread dies, using a production rate which would be normal in low helix angle work, the stock has been chewed-up or deformed, threads have been broken off and dies have been broken. Even when extremely low production rates have been employed in high helix angle thread cutting on thread dies, the quality of the work has been so disastrously affected due to numerous broken threads, gouged and chewed stock and deformed thread contours, that the practice has been to cut high helix angle threads by some other method.

The usual practice has been to cut such threads by milling or by conventional lathe cutting, using the usual lathe thread cutting tool. These techniques have produced work of reasonably good quality, but the cost has been very high. Compared to threading die speeds, the speeds obtainable by milling or by the conventional lathe thread cutting are painfully slow, and therefore when the designer has specified a high helix angle, the cost of the product has greatly increased. Furthermore, especially with milling, the tool cost has been high and the adaptability of the process has been limited since the time involved in production of new milling cutters for each thread contour, and in tool maintenance, is very considerable. Furthermore many of these methods have encountered difficulty in handling indefinite length of stock, which of course can readily be handled by a threading die.

I have conducted extensive experiments to determine the reason for the tendency to chew up the stock when employing threading dies operating at high helix angles. I have investigated the effects of thread contour, stock composition, die design, die material and lubrication, thinking that each of these might be responsible for the destructive tendency, and considering the problem first of all to be one of "picking up" by the chip on the tool, which is familiar in machining practice. I find none of these factors in responsible for the condition, and that the problem is not essentially one of cutting angle, metallurgy, or lubrication, but is instead due to the effect of the component of the high helix angle which is transverse to the axis.

I have discovered that in high helix angle thread cutting in radial dies there is a marked lateral component transverse to the axis created at any die which tends to deflect the axis laterally and make the stock dig into another die. In other words, I find that the problem is one of loss of lead center, and that the problem can be corrected by improved centering. I find, however, that it is not sufficient to rely on centering before the stock enters the threading dies and after it leaves the threading dies, but instead centering must be provided actually in the threading dies and preferably diametrically opposite each threading die. By this technique I find that the lead center can be maintained even with high or very high helix angles, that speeds characteristic of threading in threading dies at low helix angles can be used at high helix angles, and that the quality of the work is so high that it can compete successfully with milling and threading by conventional lathe cutting. This is a high tribute, especially in view of the greatly increased production rate and lower cost of die threading.

The maintenance of the lead center actually at the die and not merely at a point axially removed from the die, offers the possibility of improving the quality of the workmanship, or increasing the cutting speed for a given quality of workmanship, even with threads of low helix angle. It will therefore be evident that the invention may also be applied in cutting threads of low helix angle where the desire to improve the quality of the workmanship or increase the cutting speed justifies the use of the improved mechanism.

Considering the form of Figures 1 to 4 inclusive, I illusttrate a threading head 20, whose components are illustrated more in detail in Figure 9. The head housing 21 is circular in form, and has base flanges 22. The housing is split at 23, suitably at the top, and is provided at either end and on either side of the split with bosses 24, which are drilled at 25 to pass bolts 26 on one side and threaded at 27 on the other side to receive the bolts. The bolts serve to tighten the guides and dies later to be described. The tubular interior 28 of the head housing receives and interfits with a barrel-like die block 29 radially slotted at 30 from one end at a plurality and preferably an even number of suitably spaced and preferably equally circumferentially spaced points. The slots 30 extend partially along the length of the central barrel portion 31, terminating at 32, near the opposite end of the barrel portion. The slots 30 also extend through the reduced end portion 33 of the die block. At the opposite end of the die block there is a corresponding reduced end portion 34, similarly of circular outer contour. A keyway at 35 in the end portion 34 receives a key 36 which engages in a corresponding keyway 37 in a reduced end portion 38 of the housing 21, thus preventing rotation of the die block with respect to the housing.

Extending radially inward through each alternate radial slot, I provide radial dies 39 having thread cutting die portions 40 as well known, and having near their opposite edges cam followers 41 directed toward the barrel portion 34. In the other alternate radial slots 30 diametrically opposite to each die I provide guides 42 having suitably concave guide faces 43 adapted to engage and conform to the stock and having, at their opposite edges facing toward the barrel portion 33, followers 44.

Thus it will be seen that the dies engage the stock 45, and between each pair of dies and opposite each die the stock is engaged by a guide, the guides and dies being at the same axial position along the stock, so that the stock cannot lose its lead center during the threading operation.

Surrounding the barrel portion 34 I provide an adjusting cam 46 having cam slots 47 in the face toward the dies, all sloping in the same direction, and receiving the followers 41 on the dies. The outer circumferential edge of the cam 46 carries a gear 48 which meshes with a gear 49 on shaft 50 in bearing 51 of gear socket 52 arranged in the side of the housing 21. The gear is turned by a head 53 to rotate the cam 46 turning the cam slots 47 and moving the dies radially in and out in unison for die adjustment.

At the opposite end of the gear socket 52 an exactly similar gear arrangement rotates gear 54 on the outer circumference of cam 55, which surrounds the barrel portion 33 and carries on its face toward the followers, cam slots 56 all operating the same direction and engaging followers 44 on guides 42, so that by turning the cam 55 through the corresponding gear 49 the guides are moved radially in and out in unison.

The ends of the die head are closed by locking the plates 57 and 58, which are secured to the die block 29 by screws 59 (Figure 6).

As best seen in Figure 4, the die head 20 is supported by a suitable fastening to the flanges 22 for rotatably stationary mounting with respect to the rotating stock. As well known, the rotation and relative advance between the head and the stock can be accomplished in any convenient manner, here shown by using a lathe 60 having a live center 61 and a dead center rest 62 which provide rotation for the stock 45. The die head 20 is supported on a longitudinally movable slide 63, which is driven longitudinally in the direction of the arrow by lead screw 64, as well known.

I may equally well rotate the die head and maintain the stock rotatably stationary. I may also equally well provide longitudinal feed by moving the stock longitudinally rather than by moving the die head longitudinally, as in Figure 4. To illustrate this, I show in Figures 5 to 8 inclusive a variation which is in all essentials the same as the die head of Figures 1 to 4 inclusive, excepting that the die head is provided for face plate mounting through flanges 65 at the end portion 38 of the housing, which flanges are suitably bolted to a face plate 61' on a lathe 60'. In this case the stock is clamped at 66 on a slide 63' moving in the direction of the arrow along the action of the lead screw 64.

The die head 20 is turned by the face plate when the stock is advanced by the motion of the clamp 66, the stock passing through a tubular passage 67 in the live center and through the center of the face plate.

While in the forms of Figures 1 to 9 inclusive, I have provided for three dies and three guides, one interspersed between each pair of dies and one opposite each die, it will be evident that any suitable number of dies or guides may be used, although I preferably provide an even total number of dies and guides so that each die can have opposite it a guide. To illustrate another number, I show in Figure 10 a head having five dies, 39, and five guides 42, in a die block 29', in an arrangement similar to that of the earlier forms, but obviously intended for large work where room is provided in the die block for so many dies and guides.

While I have indicated that the dies and the guides should be radial, and should preferably be diametrically opposite, it will be understood that variations may be permitted and that the effect can be obtained without literal compliance with these requirements. In Figure 11 I illustrate a die block 29² in which the dies 39 are radial, but the guides 42 deviate from the radial and also from the diametrically opposite position, so that the guides are not equally spaced from each adjoining die. While this form is not to be recommended, it is not to be considered departing from the subject matter of the invention.

In Figures 12 and 12ª, I illustrate fragments of high helix angle threads, the thread in Figure 12 having been produced in accordance with the invention and showing a clean thread surface 68, while in Figure 12ª the thread has been die cut according to prior art practice without using the guides 42 (employing the usual central guides before entering and after leaving the die) and is badly marred at 69.

In operation in accordance with the invention, the die head including the dies and guides will be assembled as described, and adjusted to the correct radial positions by means of the adjusting nuts 53 on the appropriate gears 49 for the dies and guides. The nuts 26 will then be clamped tight to lock the guides and dies against any movement. The threads will be started by any suitable starting technique, employing where necessary a reduced end of the stock, or where necessary backing off the dies for a short length of cut, starting and subsequently returning the end for a further cut. In most cases such precautions will not of course be necessary unless it is required to thread the stock through the head and bring it into engagement with the rest 62, or the clamp 66.

Standard lubrication procedure will be employed to lubricate the dies and guides preferably involving forced circulation of lubrication.

It will be evident that the adjusting bolt heads 53 on the appropriate gears 49 may be employed for quick opening of the dies for removal of the stock after the completion of the threading operation, as well known in the art.

I find that by the procedure outlined, I can greatly increase the cutting speed even on high and very high helix angles, can obtain an acceptable quality of thread at high and very high helix angles, and can obtain a superior quality of thread cutting or greater speed even at lower helix angles. I can hold lead center effectively, even at very high speeds in cutting iron, steel, other metals, wood, plastics and the like. The invention is applicable to any round stock whether solid or tubular and over a large range of diameters.

Figure 9ª shows an end facing die 39' having a chamfering or tapering die surface 40'. Aside from the difference in die contour, the device may be identical with that employed for threading using either a single die or multiple dies or cutter 39' as preferred. The device will thus look exactly like that shown in the other figures with due allowance for the number of dies and the difference in die contour as shown in Figure 9ª.

In view of my invention and disclosure variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention what I claim as new and desire to secure by Letters Patent is:

1. In threading dies for stock, a die head comprising a housing, a die block within the housing having inward radially extending equally circumferentially spaced slots all at the same axial position and having a central longitudinal opening for the stock to be threaded, a plurality of threading dies, one in each alternate slot, a plurality of guides having concave non-cutting surfaces at the interior ends, one of the guides being in each of the slots between the slots occupied by the dies, a first cam follower on one end of each of the dies, a second cam follower on the opposite end of each of the guides, a first collar-like cam having cam slots located inside the housing and around the die block at the ends of the dies on which the first cam followers on the dies are located, the cam slots in the first cam receiving the first cam followers from the dies, and a second collar-like cam located at the end of the guides on which the second cam followers are mounted on the guides, the second cam having cam slots which receive the second cam followers on the guides, and the second cam being located inside the housing and surrounding the die block.

2. In threading dies for stock, a die head comprising a longitudinally split housing, a die block within the housing having inward radially extending equally circumferentially spaced slots all at the same axial position and having a central longitudinal opening for the stock to be threaded, a plurality of threaded dies, one in each alternate slot, a plurality of guides having concave non-cutting surfaces at the interior ends, one of the guides being in each of the slots between the slots occupied by the dies, a first cam follower on one end of each of the dies, a second cam follower on the opposite end of each of the guides, a first collar-like cam having cam slots and located inside the housing and around the die block at the end of the dies on which the first cam followers on the dies are located, the cam slots in the first cam receiving the cam followers from the dies, a second collar-like cam having cam slots and located inside the housing and around the die block at the end of the guides on which the second cam followers on the guides are located, the cam slots in the second cam receiving the cam followers from the guides, a key locking the die block against rotation with respect to the housing, and a clamp tightening the housing against the die block and the cams.

3. In threading dies for stock, a die head comprising a housing, a die block within the housing having inward radially extending equally circumferentially spaced slots all at the same axial position and having a central longitudinal opening for the stock to be threaded, a plurality of threading dies, one in each alternate slot, a plurality of guides having non-cutting surfaces at the interior ends, one of the guides being in each of the slots between the slots occupied by the dies, a first cam follower on one end of each of the dies, a second cam follower on the opposite end of each of the guides, a first collar-like cam having cam slots and located inside the housing and around the die block at the end of the dies on which the first cam followers on the dies are located, the cam slots in the first cam receiving the cam followers from the dies, a second collar-like cam having cam slots and located inside the housing and around the die blocks at the end of the guides on which the second cam followers on the guides are located, the cam slots in the second cam receiving the second cam followers from the guides, gear teeth on each of the cams and gears rotatably mounted on the housing and cooperating with the gear teeth on the cams.

4. In threading dies for stock, a die head comprising a longitudinally split housing, a die block within the housing having inward radially extending equally circumferentially spaced slots all at the same axial position and having a central longitudinal opening for the stock to be threaded, a plurality of threading dies, one in each alternate slot, a plurality of guides having non-cutting surfaces at the interior ends, one of the guides being in each of the slots between the slots occupied by the dies, a first cam follower on one end of each of the dies, a second cam follower on the opposite end of each of the guides, a first collar-like cam having cam slots located inside the housing and around the die block at the end of the dies on which the first cam followers on the dies are located, the cam slots in the first cam receiving the cam followers from the dies, a second collar-like cam having cam slots and located inside the housing and around the die block at the end of the guides on which the second cam followers on the guides are located, the cam slots in the second cam receiving the second cam followers from the guides, a key locking the housing to the die block against relative rotation, gear teeth on the cams, gears rotatably mounted on the housing and cooperating with the gear teeth on the cams, and a clamp locking the housing against the die block and the cams.

FRANK GRIFFITH.

REFERENCES CITED

The following references are of record in the file of this patent:

UNITED STATES PATENTS

| Number | Name | Date |
|---|---|---|
| 56,840 | Wolfenden | July 31, 1866 |
| 63,741 | Nelson | Apr. 9, 1867 |
| 263,402 | Hart | Aug. 29, 1882 |
| 640,639 | Dilly | Jan. 2, 1900 |
| 1,292,025 | Nonneman | Jan. 21, 1919 |
| 1,342,535 | Eden | June 8, 1920 |
| 1,639,028 | Eden | Aug. 16, 1927 |

FOREIGN PATENTS

| Number | Country | Date |
|---|---|---|
| 17,711 | Germany | 1882 |